United States Patent [19]

Hunnicutt, III. et al.

[11] Patent Number: 4,991,766

[45] Date of Patent: Feb. 12, 1991

[54] PROCESS OF MANUFACTURING A CONICAL FLIGHT ASSEMBLY

[76] Inventors: Joseph W. Hunnicutt, III., 1530 Lauden Hts. Rd., Charleston, W. Va. 25314; Jimmy Taylor, Box 227, Mt. Gay, W. Va. 25637; David L. Singleton, 3608 Hummingbird Dr., Poland, Ohio 44514

[21] Appl. No.: 540,469

[22] Filed: Jun. 19, 1990

Related U.S. Application Data

[63] Continuation of Ser. No. 417,517, Oct. 5, 1989, abandoned.

[51] Int. Cl.[5] .......... B23K 9/04; B23K 31/02; B04B 1/08; B04B 7/08

[52] U.S. Cl. .......... 228/175; 228/185; 44/626; 494/73; 29/889

[58] Field of Search .......... 494/37, 70, 73; 44/626; 228/175, 178, 182, 185, 119; 29/889, 279, 156.8 CF

[56] References Cited

U.S. PATENT DOCUMENTS

| | | | |
|---|---|---|---|
| 2,305,996 | 12/1942 | Howe . | |
| 2,370,353 | 2/1945 | Howe | 210/374 |
| 3,159,106 | 12/1964 | Schumbacker et al. | 29/156.8 CF |
| 3,294,315 | 12/1966 | Stewart et al. | 29/156.8 CF |
| 3,409,521 | 11/1968 | Sharples | 494/73 |
| 3,673,659 | 7/1972 | Ishii et al. | 29/156.8 CF |
| 3,708,846 | 1/1973 | Wörner | 29/156.8 CF |
| 4,059,884 | 11/1977 | Weill | 228/119 |
| 4,450,611 | 5/1984 | Ito et al. | 228/182 |
| 4,738,593 | 4/1988 | Reifschneider | 29/156.8 CF |
| 4,832,252 | 5/1989 | Fraser | 228/119 |

FOREIGN PATENT DOCUMENTS

| | | | |
|---|---|---|---|
| 449236 | 9/1948 | Canada | 228/185 |
| 197801 | 1/1978 | U.S.S.R. | 228/47 |

OTHER PUBLICATIONS

Coal Preparation, Leonard et al., 1968, pp. 12-14-1-2-21.

*Primary Examiner*—Sam Heinrich
*Attorney, Agent, or Firm*—Sutherland, Asbill & Brennan

[57] ABSTRACT

A process for manufacturing an improved flight assembly for a vertical centrifugal separator. e.g., of the type used to dry coal, is disclosed. The flights are first welded to the cone on which they are to be carried, then the outside edges of the flights are machined, for example on a vertical mill, after which a hard facing is applied to at least a portion of each flight. Preferably a stabilizing ring is welded to the bottoms of the flights before machining. A machining tolerance of plus or minus 1/64 inch (with respect to the gap between each flight and the surrounding conical screen with which the flight assembly is to be used) is preferred. The hard facing may be a weld having a hardness of at least about 40 Rockwell (C scale).

22 Claims, 5 Drawing Sheets

PROCESS OF MANUFACTURING A CONICAL FLIGHT ASSEMBLY

This application is a continuation of application Ser. No. 417,517, filed Oct. 5, 1989, now abandoned.

This invention relates to a process of manufacturing a conical flight assembly for use in a vertical centrifugal separator of the type used to dry coal.

Vertical centrifugal separators, for example of the type disclosed in U.S. Pat. No. 2,370,353 to Howe, are commonly used to dewater coal at a coal washing plant. A slurry of coal in water, together with sand, shale, and other fine particles, is poured into the top of the separator. The larger pieces of coal (e.g., up to about one-quarter inch in diameter) are separated from the water and waste material, and the clean coal is released in a substantially dry state. The slurry charged to the separator typically will contain about 20 to 35 weight percent water. The clean coal usually will have a moisture content below about 10 percent, and preferably as low as about 4 percent or less. These figures refer to surface water only, not internal moisture, which is sometimes called "inherent moisture." The internal moisture content of coal can range from as low as about one percent to as high as about 10 percent.

Another common use for vertical centrifugal separators is to separate water from rock refuse. The clarified water typically is recycled, and the separated refuse is disposed of, for example in a landfill.

A vertical centrifugal separator is comprised of a vertical drive shaft assembly, a frustoconical flight assembly coaxially carried by the drive shaft assembly, and a larger frustoconical screen, also carried by the drive shaft assembly, which concentrically surrounds the flight assembly. The drive shaft assembly, flight assembly, and screen are enclosed in a housing, sometimes called a "water shield." The apparatus is oriented so that the bases of the cones are down and the tops, or apexes, are up.

The flight assembly consists essentially of a hollow frustrum of a right circular cone that has a plurality of parallel, spiral, hindrance flights attached to the exterior of its lateral wall. The cone typically has a slope angle (meaning the angle between the lateral wall and the axis of the cone) of about 30 degrees. Usually there are six to ten flights on the cone. The flights are mounted on the cone at substantially equal distances from one another. Each flight protrudes perpendicularly from the cone wall and spirals like a ribbon part way around the cone, descending from the apex of the cone to the base.

In all of the prior art flight assemblies of which we are aware, the angle of spiral for each mounted flight has been approximately 30 degrees. By "angle of spiral" is meant the acute angle formed by the intersection o the plane of the flight with a vertical plane. By "vertical plane" is meant a plane passing through the axis of the cone. Accordingly, the greater the angle of spiral, the longer the flight must be to reach from the apex of the cone to the base.

The angle of spiral is substantially uniform throughout the length of the flight in all of the flight assemblies of which we are aware. Thus, the flights are not wavy, scoop-shaped, or convex; rather, they descend in a straight line from the apex of the cone to the base.

The screen is mounted in the separator so as to surround the conical flight assembly, with just a slight gap between the outside edges of the flights and the inner surface of the screen, e.g., about 1/32 of an inch. Both the flight assembly and the screen are rotated at high speeds in the same direction by the drive shaft assembly to which they are attached. The direction of rotation is the same direction as the downward slope of the flights. The screen may be surrounded by a concentric, rigid basket to provide support for the screen and keep it from going out-of-round as it is spun. The drive shaft assembly is so designed as to spin the screen at a slightly faster speed than the flight assembly. This typically is accomplished by use of an inner drive shaft that spins the flight assembly, and a hollow, outer drive shaft, surrounding the inner shaft, which spins the screen. For example, the flight assembly might rotate at a speed of, say, 658 rpm, while the screen rotates at a speed of 667 rpm. Thus, while both are rotating at high speeds, the screen slowly, constantly moves past the flights. If a basket is used, it is mounted so as to rotate in unison with the screen.

While the flight assembly and screen are spinning, the coal slurry is charged from above into the annular space between the flight assembly and the screen. The flights help pull the slurry around the annular space, imparting centrifugal force to it. The coal slowly moves down the spiral flights while it is pressed against the inside of the screen by the centrifugal force. At the bottom of the flights, the clean, dry coal falls onto collection means, for example a moving conveyor belt. The water, hurled out by centrifugal force, flies radially through the screen, hits and runs down the inside wall of the housing, and is collected in an effluent chamber below. Sand, coal dust, and other debris small enough to pass through the openings in the screen are hurled out with the water. A typical size screen opening is about one-half millimeter, in the shortest diameter.

The slow, steady movement of the screen past the flights helps the large pieces of coal tumble down the flights, and also helps dislodge any pieces of coal that temporarily lodge in the openings in the screen. If a piece of coal seated in a screen opening is too large to pass under the flights, it is swept loose as the screen advances past the next flight.

Because of the abrasive nature of the solids being separated and the high centrifugal forces involved, the screens in vertical centrifugal separators are subjected to substantial wear. Holes form in the screen, causing the loss of some coal with the smaller particle waste solids. Screen condition can be monitored during operation of the separator by checking the solids content of the dirty water collected in the effluent chamber. As new and larger holes are worn into the screen, more solids pass through with the water. When too much coal is being lost in the effluent, the separator is temporarily taken out of operation and the worn screen is replaced with a new or rebuilt one.

Flights on the conical flight assemblies wear out also, but screens usually wear out faster and need to be replaced more often. Thus, for example, in coal dewatering operations using the centrifugal dryers of the prior art, the flights typically must be replaced after approximately 1,000 to 1,200 hours of use, and the screen typically has to be replaced after only 400 to 500 hours of use.

Prior to the present invention, all commercially available flights of which we are aware have been fastened to the cone by a row of bolts. The bolts pass through holes in the base of the flight, which is a right angle bend formed near the bottom edge of the flight. Also, the cone has consisted of an inner base cone and an outer sleeve cone that fits over the base cone. The base cone is attached to the inner drive shaft. Each bolt passes through the base of the flight and the sleeve cone, and is held in a threaded hole tapped into the wall of the base cone. A typical flight assembly will have eight flights, each being held to the cone by four such bolts. Because so many bolts are involved, it takes considerable time to remove and replace all of the flights in such an assembly. This results in costly "down time" for the coal plant.

The present invention provides a conical flight assembly that can take the place of those of the prior art. Because of the manner in which it is manufactured, the flight assembly of the present invention can be constructed to a closer tolerance, as regards the clearance between the flights and the screen, than in prior art assemblies. The closer tolerance results in longer screen life, which means less frequent replacement of the screens, and, therefore, less down time and equipment expense.

In the present invention the flights are mounted, as before, on the lateral wall of a hollow frustrum of a right circular cone. The cone is made of ferrous metal, preferably a mild steel, and includes means for coaxial attachment of the cone to the inner drive shaft of the centrifugal separator.

Each of the flights is made of a length of steel plate, also preferably mild steel. Each plate may be thought of as having a lengthwise inside edge; an outside edge that is opposite, and substantially parallel to, the inside edge; a shorter top edge at one end of the plate; a bottom edge at the opposite end of the plate; a face; and an underside. To form the flights for a particular assembly, all of the lengths of plate are identically bent to conform each plate to the outer curvature of the frustrum. Each plate is bent so that its inside edge can be placed against the lateral wall of the frustrum in such an orientation that the plate spirals part way around the frustrum from approximately the top of the frustrum to approximately the base thereof, without any substantial gaps between the plate and the frustrum. Each resulting flight is then welded to the lateral wall of the frustrum so that its top edge is located at or near the top of the frustrum, its bottom edge is located at or near the base of the frustrum, its lengthwise inside edge is welded to the frustrum, and its face faces toward the top of the frustrum and protrudes substantially perpendicularly from the frustrum's lateral wall. Each flight spirals downward part way around the frustrum, from approximately the top of the frustrum to approximately the base thereof. Preferably each flight extends a relatively short distance below the base, e.g., about one to four inches. The flights are all arranged parallel to one another and at substantially equal distances apart.

After all of the flights are welded in place, the outside edge of each flight is machined to conform it within a predetermined tolerance to the frustoconical figure defined by the inner surface of the screen with which the flight assembly is to be used. Preferably the tolerance will be within plus or minus 1/64 inch. To facilitate this step of the process, it is preferred that a circular stabilizing ring be attached to the bottom edges of all the flights before they are machined. Preferably the ring is welded to the flights. Use of the ring helps hold the flights rigid for the machining operation; it also provides a convenient handle for workers to grasp when moving the flight assembly. Preferably the stabilizing ring will have a round cross section, so as not to cut into one's hands. It is believed that the presence of the stabilizing ring also helps the flights and screen wear longer when in use in the separator.

After machining all of the flights, a hard facing is applied to at least a portion of each flight. This is done by welding to the face of the flight a metal weldment that borders the flight's outside edge. By "weldment" is here meant a bead of weld. The weldment is of a composition that is harder than the steel of which the flight is made. For example, the weldment may have a hardness of at least about 40 Rockwell (C scale). Preferably, such weldment also is placed on the top edge of each flight and on the face and underside adjacent the top edge. It is also preferred that weldment be placed on the bottom edge of each flight and that the face of each flight have a substantially continuous zone of weldment extending downward at least about five inches from the top edge of the flight and covering the width of the face, as well as a continuous zone extending upward at least about one-and-one-half inches from the bottom edge and also covering the width of the face of the flight. Experience has shown that these are the regions of greatest wear on the flights. By hardening these surfaces with weldment, the life of the flight assembly is lengthened considerably.

In using the frustoconical flight assembly of the present invention, when the flights are worn to the point of needing replacement, the assembly can be replaced by removing as few as four bolts. By removing and replacing only four bolts, rather than 32 bolts, the time to replace worn-out flights by use of the assembly of the present invention may be as short as about one-half hour, compared to about three hours when working with the design of the prior art.

The invention will be better understood by considering the drawings accompanying this specification, a description of which now follows.

Figure 1:
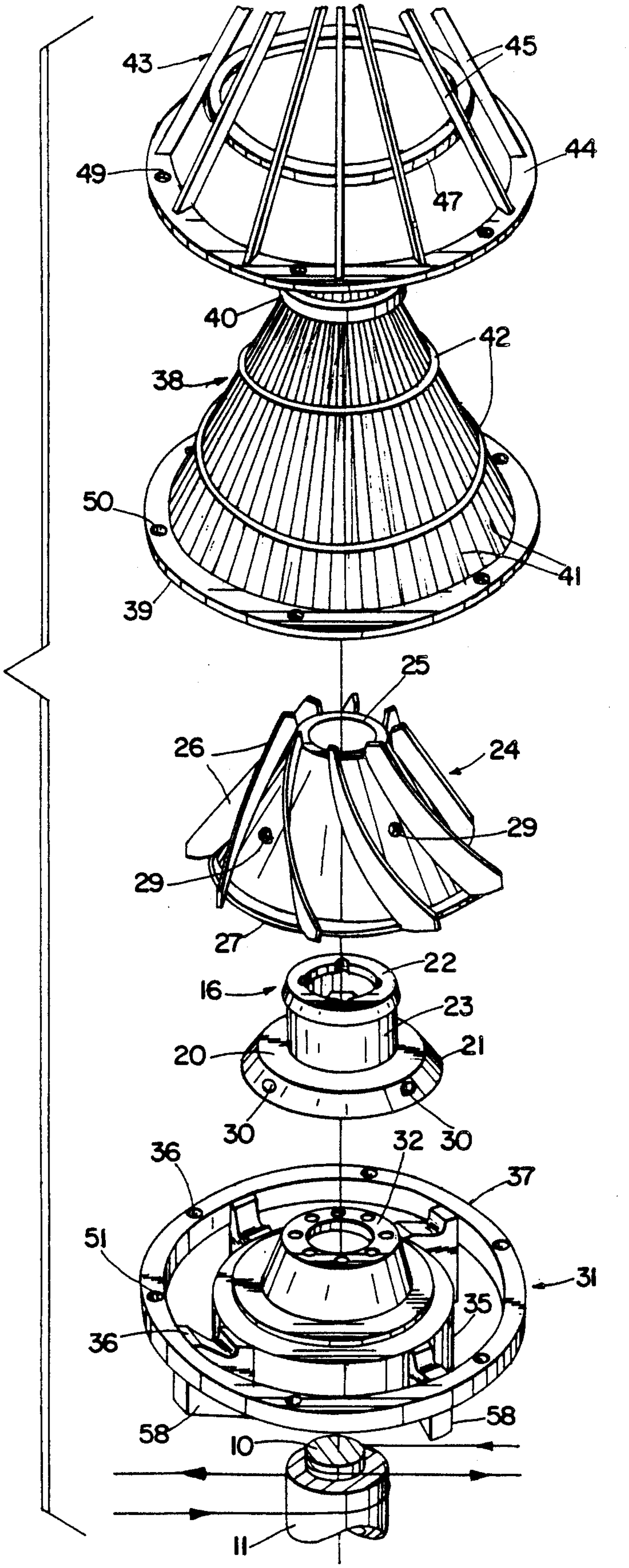
FIG. 1 is an exploded, isometric view of the principal parts of the centrifugal separator of the present invention, not including the housing. Because of space limitations, the top part (the basket) is shown in fragmentary form.

With reference to FIGS. 1, 2, 9, and 10, a vertical centrifugal separator is shown having an inner drive shaft 10 and an outer drive shaft 11. Motor 12 turns belts 13, which drive a differential gear assembly (not shown) in housing 14, which rotates the shafts 10 and 11. Shafts 10 and 11 are driven in the same direction (see FIG. 1) but shaft 11 rotates at a slightly higher speed. Fastened to shaft 10 is a flange 15, atop of which rests sleeve 19. Flight assembly support 16 is attached to drive shaft 10 by four bolts 17 that pass through plate 18 and sleeve 19 and are anchored in threaded holes in flange 15. Attached to sleeve 19 is plate 20, having a bevelled edge 21. Attached to the top of plate 20 is collar 23, which is capped by inner ring 22, also having a bevelled edge. Attached to both sleeve 19 and collar 23 is inner plate 18.

Conical flight assembly 24 rests on top of flight assembly support 16. Flight assembly 24 consists of a hollow frustrum of a cone 25 made of mild steel, eight flights 26 mounted thereon, and a stabilizing ring 27 (shown in FIG. 1, not in FIG. 2). Flight assembly 24 is fastened to assembly support 16 by four bolts 28 (shown in FIGS. 9 and 10) that pass through mounting holes 29 in frustrum 25 and are anchored in threaded holes 30 in horizontal plate 20.

Mounted atop outer drive shaft 11 is rotor assembly 31. Rotor assembly 31 comprises a hub 32 which is held to shaft 11 by eight bolts 33, which are anchored in collar 34, which is attached to outer shaft 11. Hub 32 is integral with inner ring 35, which is connected by four spokes 36 to outer ring 37.

Mounted on top of outer ring 37 of rotor assembly 31 is a frustoconical screen 38, comprised of bottom flange 39, upper ring 40, spaced apart rod members 41, and horizontal reinforcing hoops 42. Resting on top of screen 38 is basket 43, which is comprised of bottom flange 44, strut members 45, a top ring 46 (shown in FIG. 2, not in FIG. 1), and horizontal middle ring 47. Ring 47 bears against rods 41 of screen 38, keeping the screen in-round during its high speed rotation. Basket 43 and screen 38 are held to rotor assembly 31 by bolts 48 that pass through mounting holes 49 and 50 and anchor in threaded holes 51 in rotor ring 37.

Figure 2:
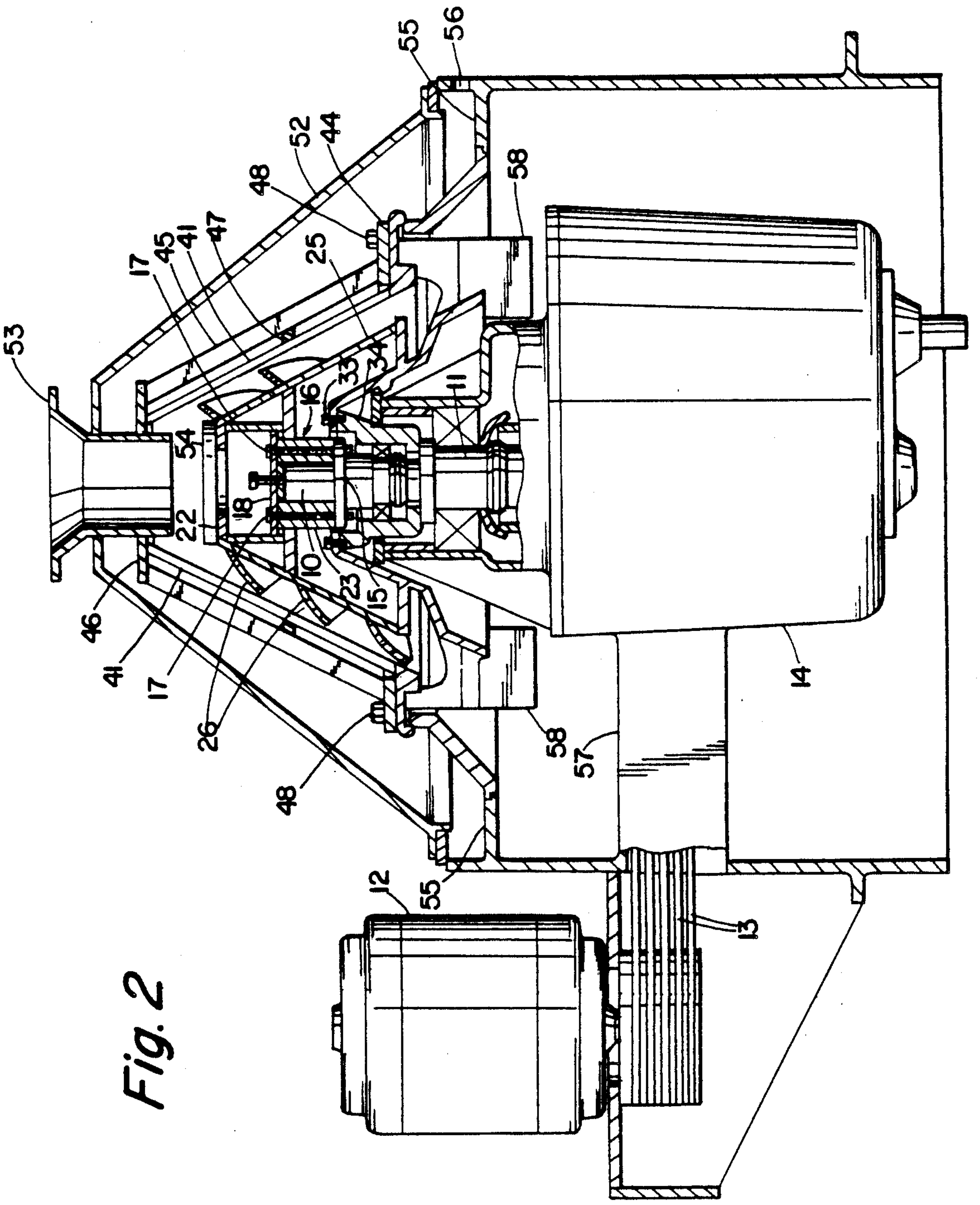
FIG. 2 is an assembled view, in partial cross-section, of the centrifugal separator of the present invention, including the housing. It is drawn to a larger scale than FIG. 1.

As seen in FIG. 2, a frustoconical housing 52 covers the assembled basket 43, screen 38, and flight support assembly 24. Protruding through a hole in the top of housing 52 is a funnel-shaped charging hopper 53.

To use the vertical centrifugal separator to dry coal, drive shafts 10 and 11 are rotated at high speeds in a counterclockwise direction (referring to the orientation seen in FIG. 1). Shaft 10 is rotated at a slightly higher speed, e.g., about 667 rpm versus 658 rpm for shaft 10, so that screen 38 constantly glides by flights 26 of the conical flight assembly 24. The coal slurry (not shown in the drawings) is poured through hopper 53 into the annular space between screen 38 and the cone 25 on which flights 26 are mounted. To protect the heads of bolts 17, cover plate 54 (shown in FIG. 2) is attached to inner ring 22 by bolts (not shown). The slurry is caught and propelled around the annular space by flights 26. Water and small suspended solids (not shown in the drawings) fly radially through the spaces between rods 41, through the openings in basket 43, strike the inside wall of housing 52 and fall into collection trough 55, known as a "launder." The water and suspended solids flow out of launder 55 through outlet pipe 56. The dried coal falls out of the bottom of the annular space, drops past gear housing 14, and is collected on a conveyor belt (not shown) that passes below the separator. Coal that collects on top of housing 14 or housing 57 for belts 13 is swept off by the revolution of plow members 58 that depend from, and are integral with, spokes 36 of rotor assembly 31.

Figure 3:
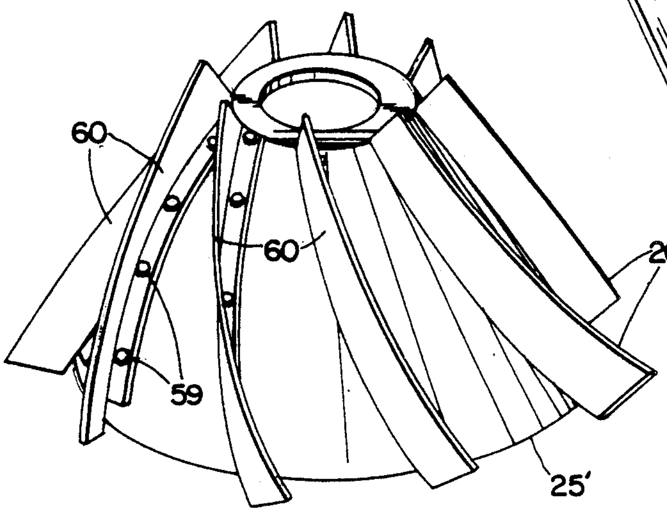
Fig. 3 (PRIOR ART)
FIG. 3 is an isometric view of a conical flight assembly of the prior art, drawn to yet a larger scale than FIG. 2.
Figure 4:
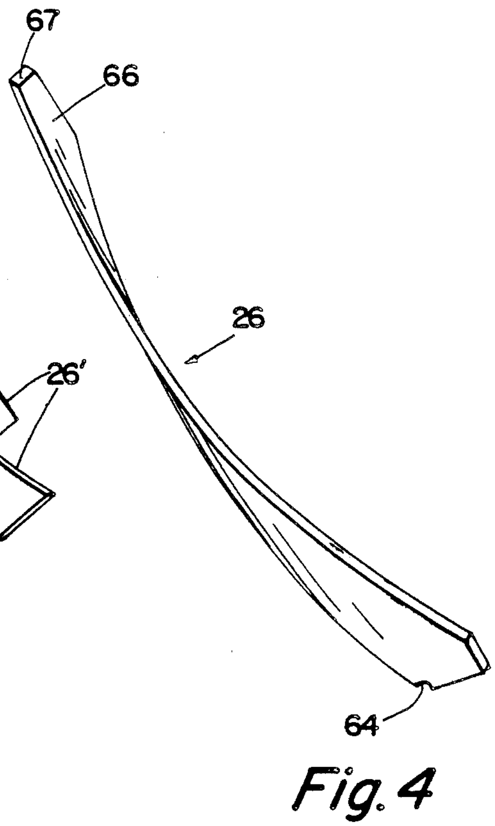
FIG. 4 is an enlarged, isometric view of a bent length of steel plate being used to form a flight in the method of the present invention.

As seen in FIG. 3, the frustoconical flight assembly of the prior art is comprised of cone 25′, onto which flights 26′ are held by bolts 59. This prior art flight support assembly normally is mounted on top of a base cone (not shown) which has threaded holes to receive bolts 59. Disassembly of the device for replacement of flights 26′ is a time-consuming task. Not only must all of the bolts 59 that hold flights 26′ be removed, but, when reassembling the parts, the holes in the feet 60 of the flights, in the wall of cone 25′, and in the base cone (not shown) all have to be lined up.

This is a tedious and time-consuming operation. The fabrication method of the present invention is illustrated in FIGS. 4 through 8. First, lengths of steel plate 26 are bent (FIG. 4) to conform to the surface of the lateral wall of the truncated cone 25. A circular notch 61 is cut in the bottom edge 68 of each plate 26.

Figure 5:
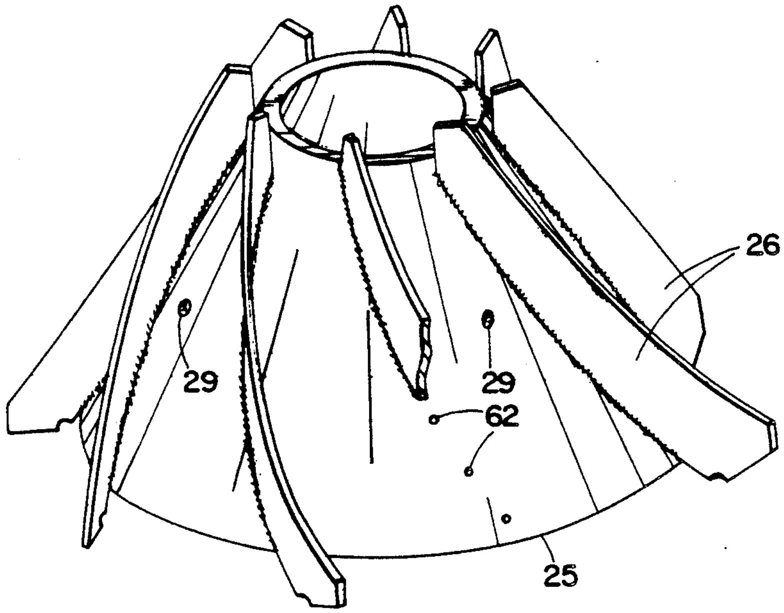
FIG. 5 is an isometric view (partially broken away) of a partially completed conical flight assembly of the present invention, drawn to a slightly larger scale than FIG. 3.

As seen in FIG. 5, the flights 26 are then welded to the lateral wall of truncated cone 25. To help align the flights 26, rows of small holes 62 are drilled or punched through the wall of the cone, for example by use of a numerically controlled tool. These rows of holes 62 define the proper placement of the flights 26.

Figure 6:
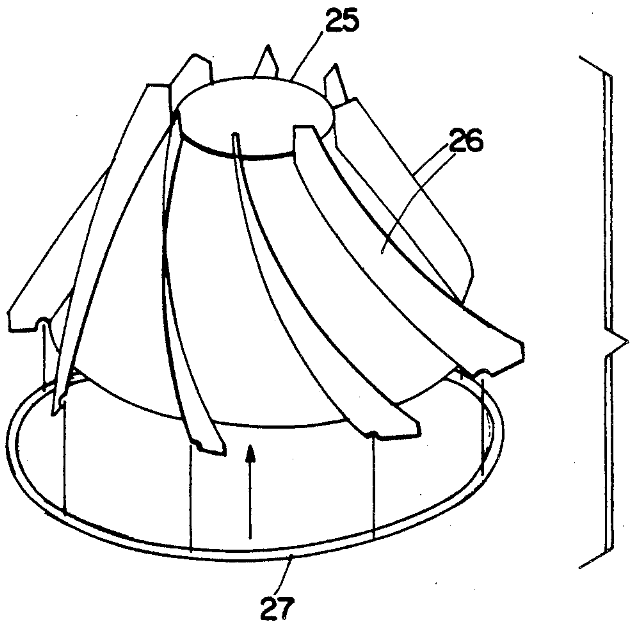
FIG. 6 is a schematic, isometric view (approximately the same scale as FIG. 2) representing the attaching of the stabilizing ring to the partially completed flight assembly of FIG. 5.

As seen in FIG. 6, after all of the flights 26 are welded to the truncated cone 25, a stabilizing ring 27 is placed in the notches 61 in the bottom edges of the flights 26 and is welded in place. This makes the flight assembly easier to handle and gives added rigidity to the flights 26.

Figure 7:
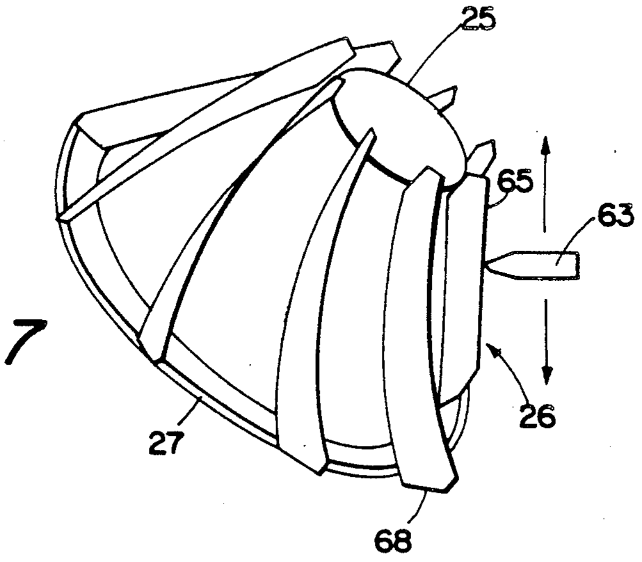
FIG. 7 is a schematic, isometric view (the same scale as FIG. 6) representing the machining of the partially completed flight assembly of FIG. 6.

As shown in FIG. 7, the next step of the operation is to machine the top edges of each of the flights 26, for example using a vertical milling machine. Milling cutter 63 (shown schematically) is moved either up or down along the top edge of each flight 26 as cone 25 is slowly rotated. In this way the flights can be conformed within a predetermined tolerance to the frustoconical figure defined by the inner surface of the screen 38 with which the flight assembly 24 is to be used. Preferably the tolerance will be within plus or minus 1/64 inch.

Figure 8:
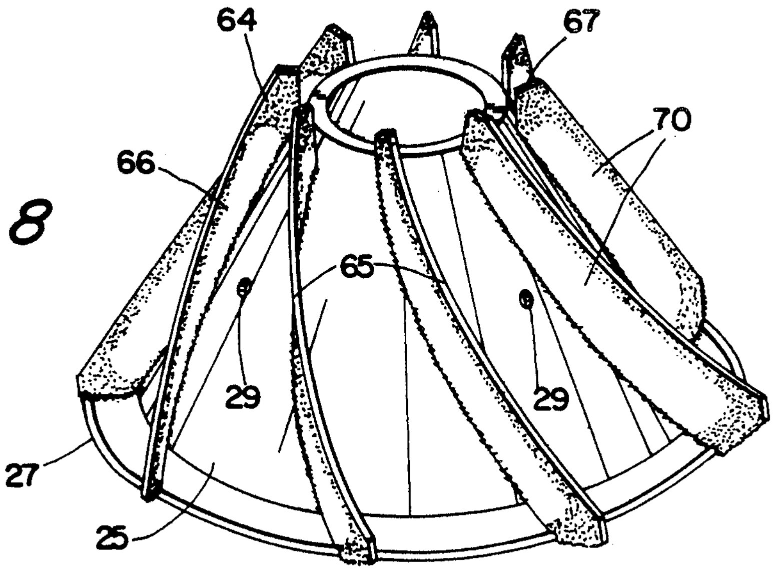
FIG. 8 is an isometric view (about the same scale as FIG. 3) of a finished flight assembly of the present invention.

After machining the flights 26, a hard facing 64 is applied to various regions of each flight. This is done by laying a weldment on the mild steel flights. As seen in FIG. 8, the hard facing borders the outside edge 65 on the face 66 of the flight. To lessen wear from the incoming coal slurry, hard facing also is placed on the top edge 67 of each flight, as well as on the regions of the underside 70 and the face 66 that border top edge 67. The hard facing on this region of the face 66 extends downward at least about five inches from the top edge 67 and covers the width of the face.

Hard facing also is welded to the region of face 66 that is adjacent the bottom edge 68 of each flight. Here the weldment occupies a substantially continuous zone extending upward at least about 1-½ inches from the bottom edge 68 and covering the width of face 66.

When applying the strip of weldment bordering the outside edge 65 of each flight on the face 66 of the flight, a copper form (not shown) preferably is clamped over the top of the machined outside edge 65 to prevent the weldment from protruding above the edge. This preserves the tolerance to which the flights were machined. The presence of the hard facing in the areas of the flights described adds considerably to the durability of the conical flight assembly, and, thus, lengthens screen life as well.

Figure 9:
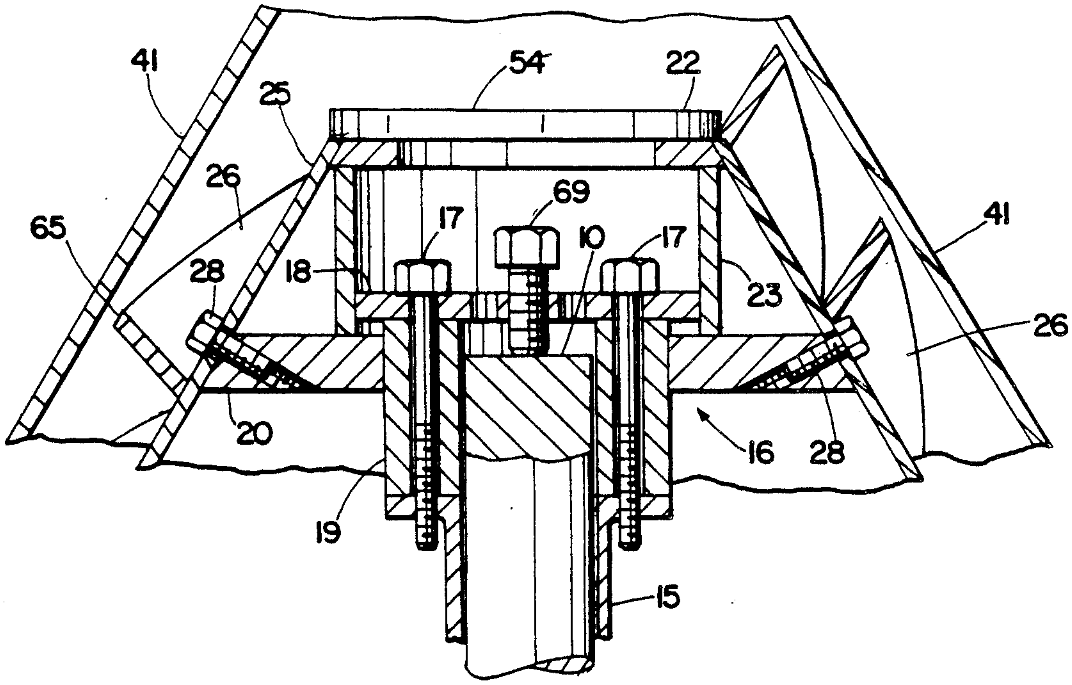
FIG. 9 is an enlarged cross-sectional view of the means shown in FIG. 2 of attachment of the conical flight assembly to the inner drive shaft.
Figure 10:
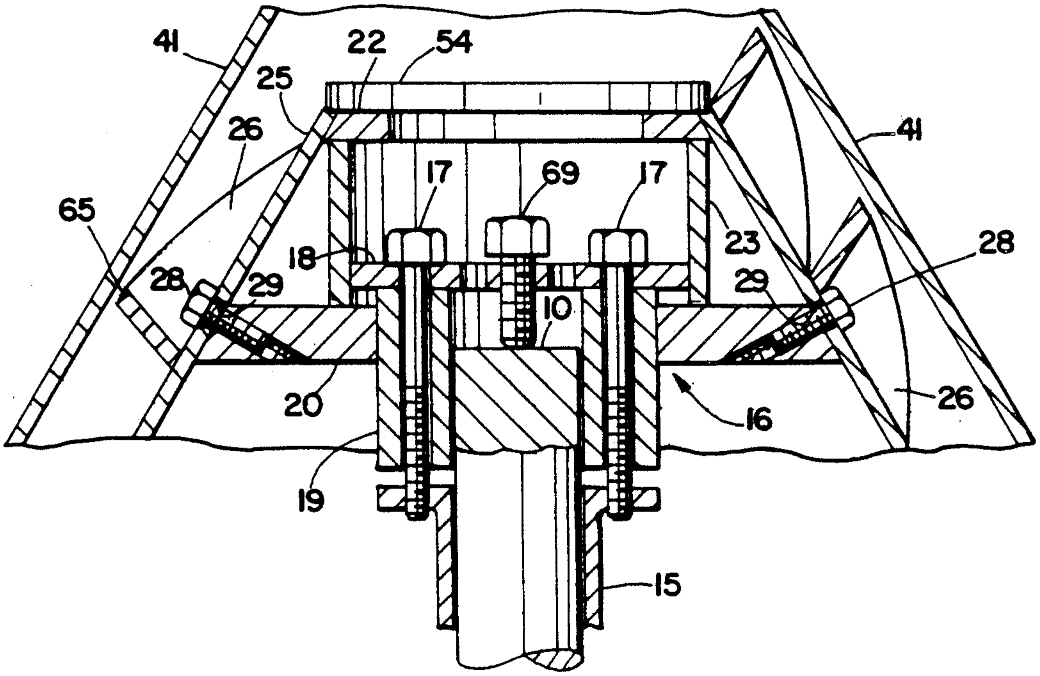
FIG. 10 is the same view as FIG. 9, but after adjustment of the clearance between the flights and the screen.

During use of the vertical centrifugal separators of the type with which the present invention is concerned, some wear will always occur both on the inner surface of the screen 38 and on the outside edges 65 of the flights 26. As the original clearance between those parts widens, the efficiency of the separation of water from solids declines. FIGS. 9 and 10 illustrate a mechanism for adjusting that clearance.

FIG. 9 illustrates the mounting for conical flight support 24 in its original position. As shown there, sleeve 19 is in contact with collar 15. Once the gap between screen rods 41 and the top edge 65 of each flight 26 gets too wide, bolts 17 can be backed out an appropriate distance and set screw 69 can be tightened down to take up the slack. Set screw 69 is held in a threaded hole in plate 18, which is welded to collar 23. As set screw 69 is turned down, collar 19 is drawn upward, pulling plate 20 and the attached truncated cone 25 with it. This reduces the clearance between the outside edges 65 of flights 26 and the screen rods 4 accordingly.

We claim:

1. A process of manufacturing a frustoconical flight assembly for use in a vertical centrifugal separator comprised of a vertical drive shaft assembly, a frustoconical flight assembly coaxially carried by said drive shaft assembly, and a frustoconical screen also carried by said drive shaft assembly, which screen concentrically surrounds said flight assembly, wherein said flight assembly consists essentially of a hollow, ferrous frustrum of a right circular cone having a plurality of parallel, spiral, hindrance flights attached to the frustrum's lateral wall, said process comprising the steps of:
   - (a) obtaining a hollow, ferrous frustrum of a right circular cone;
   - (b) obtaining a plurality of equal size lengths of steel plate, each said length of plate having a lengthwise inside edge; an outside edge that is opposite, and substantially parallel to, the inside edge; a shorter top edge at one end of the plate; a bottom edge at the opposite end of the plate; a face; and an underside;
   - (c) forming flights out of said lengths of plate by identically bending each of the plates to conform it to the outer curvature of said frustrum, so that the inside edge of the plate can be placed against the lateral wall of the frustrum in such an orientation that the plate spirals part way around the frustrum from approximately the top of the frustrum to approximately the base thereof, without any substantial gaps between the plate and the frustrum;
   - (d) welding said flights to the lateral wall of said frustrum in a parallel relationship to one another, at substantially equal distances from one another, each said welded flight being positioned so that its top edge is located at approximately the top of the frustrum; its bottom edge is located at approximately the base of the frustrum; its lengthwise inside edge is welded to the frustrum; its face faces toward the top of the frustrum and protrudes substantially perpendicularly from the frustrum's lateral wall; and the flight spirals downward part way around the frustrum;
   - (e) machining the outside edge of each said welded flight to conform all of the flights within a predetermined tolerance to the frustoconical figure defined by the inner surface of the frustoconical screen with which the flight assembly is to be used; and
   - (f) applying a hard coating to at least a portion of each said machined flight by welding to said face of the flight a metal weldment that borders the flight's outside edge, said weldment being of a composition that is harder than the steel of which said flight is made.

2. The manufacturing process of claim 1 wherein, in step (f), said weldment also is welded to the top edge of each flight and to the face and underside adjacent said top edge.

3. The manufacturing process of claim 2 wherein, in step (f), said weldment also is welded to the bottom edge of each flight.

4. The manufacturing process of claim 3 wherein, in step (f), said weldment also is welded to the face of each flight in a substantially continuous zone extending downward at least about five inches from the top edge of the flight and covering the width of the face.

5. The manufacturing process of claim 4 wherein, in step (f), said weldment also is welded to the face of each flight in a substantially continuous zone extending upward at least about one-and-one-half inches from the bottom edge of the flight and covering the width of the face.

6. The manufacturing process of claim 5 wherein the frustrum and the flights are all made of mild steel.

7. The manufacturing process of claim 6 wherein, between said steps (d) and (e), a circular stabilizing ring is fastened to the bottom edges of all of the flights.

8. The manufacturing process of claim 7 wherein the stabilizing ring has a round cross-section and is fastened to the bottom edges of the flights by welding.

9. The manufacturing process of claim 1 wherein, in step (a), the hollow, ferrous frustrum of a right circular cone has a slope angle of approximately 30 degrees.

10. The manufacturing process of claim 9 wherein, in step (d), said flights are welded to the frustrum at an angle of spiral of approximately 30 degrees.

11. The manufacturing process of claim 1 wherein, in step (d), each flight extends about one to four inches below the base of the frustrum.

12. The manufacturing process of claim 7 wherein, in step (d), each flight extends about one to four inches below the base of the frustrum.

13. The manufacturing process of claim 9 wherein, in step (d), each flight extends about one to four inches below the base of the frustrum.

14. The manufacturing process of claim 10 wherein, in step (d), each flight extends about one to four inches below the base of the frustrum.

15. The manufacturing process of claim 1 wherein, in step (e), the tolerance is within plus or minus 1/64 inch.

16. The manufacturing process of claim 2 wherein, in step (e), the tolerance is within plus or minus 1/64 inch.

17. The manufacturing process of claim 4 wherein, in step (e), the tolerance is within plus or minus 1/64 inch.

18. The manufacturing process of claim 7 wherein, in step (e), the tolerance is within plus or minus 1.64 inch.

19. The manufacturing process of claim 8 wherein, in step (e), the tolerance is within plus or minus 1/64 inch.

20. The manufacturing process of claim 11 wherein, in step (e), the tolerance is within plus or minus 1/64 inch.

21. A process of manufacturing a frustoconical flight assembly for use in a vertical centrifugal separator comprised or a vertical drive shaft assembly, a frustoconical flight assembly coaxially carried by said drive shaft assembly, and a frustoconical screen also carried by said drive shaft assembly, which screen concentrically surrounds said flight assembly, wherein said flight assembly consists essentially of a hollow, ferrous frustrum of a right circular cone having a plurality of parallel, spiral hindrance flights attached to the frustrum's lateral wall, said process comprising the steps of:

(a) obtaining a hollow frustrum of a right circular cone having a slope angle of approximately 30 degrees, said frustrum being made of mild steel;

(b) obtaining a plurality of equal size lengths of steel plate, each said length of plate having a lengthwise inside edge; an outside edge that is opposite, and substantially parallel to, the inside edge; a shorter top edge at one end of the plate; a bottom edge at the opposite end of the plate; a face; and an underside;

(c) forming flights out of said lengths of plate by identically bending each of the plates to conform it to the outer curvature of said frustrum, so that the inside edge of the plate can be placed against the lateral wall of the frustrum in such an orientation that the plate spirals part way around the frustrum from approximately the top of the frustrum to approximately the base thereof, without any substantial gaps between the plate and the frustrum;

(d) welding said flights to the lateral wall of said frustrum in a parallel relationship to one another, at substantially equal distances from one another, each said welded flight being positioned so that its top edge is located at approximately the top of the frustrum; its bottom edge is located at approximately the base of the frustrum; its lengthwise inside edge is welded to the frustrum; its face faces toward the top of the frustrum and protrudes substantially perpendicularly from the frustrum's lateral wall; and the flight spirals downward part way around the frustrum;

(e) welding a circular stabilizing ring having a round cross-section to the bottom edges of all of the flights;

(f) machining the outside edge of each said welded flight to conform all of the flights within a tolerance or plus or minus 1/64 inch to the frustoconical figure defined by the inner surface of the frustoconical screen with which the flight assembly is to be used, and (g) to each flight applying a coating of weldment having a hardness of at least about 40 Rockwell (C scale) on the top and bottom edges, on the face in a substantially continuous zone extending downward at least about five inches from the top edge of the flight and covering the width of the face, on the face in a line bordering the top edge of the flight, on the face in a substantially continuous zone extending upward at least about one-and-a-half inches from the bottom edge of the flight and covering the width of the face, and to the underside adjacent the top edge.

22. The process of claim 21 wherein, in step (d), the angle of spiral of the welded flight is approximately 30 degrees.

* * * * *

UNITED STATES PATENT AND TRADEMARK OFFICE
CERTIFICATE OF CORRECTION

PATENT NO. : 4,991,766

DATED : February 12, 1991

INVENTOR(S) : Joseph W. Hunnicutt, III, David L. Singleton, Jimmy Taylor and Stanley A. Skeens

It is certified that error appears in the above-identified patent and that said Letters Patent is hereby corrected as shown below:

TITLE PAGE:

Inventors' data is corrected to add -- Stanley A. Skeens, Danville, West Virginia--;

Assignee data is added to read -- Assignee: Guyan Machinery Company, Chapmanville, West Virginia--;

Column 1, line 55, "o" is corrected to read -- of--;

Column 7, line 28, "4" is corrected to read -- 41--;

Column 8, line 68, "1.64" is corrected to read -- 1/64--.

Signed and Sealed this

Twenty-eighth Day of July, 1992

*Attest:*

DOUGLAS B. COMER

*Attesting Officer* *Acting Commissioner of Patents and Trademarks*